US010294047B2

(12) United States Patent
Hathaway et al.

(10) Patent No.: US 10,294,047 B2
(45) Date of Patent: May 21, 2019

(54) ENCLOSED RAILWAY FREIGHT CAR OR OVER-THE-ROAD TRAILER VAN HAVING WALLS AND ROOF MOVABLE IN A VERTICAL DIRECTION

(71) Applicants: Richard C. Hathaway, Greenville, OH (US); M. Kent Bridges, New Madison, OH (US)

(72) Inventors: Richard C. Hathaway, Greenville, OH (US); M. Kent Bridges, New Madison, OH (US)

(73) Assignee: KACI INTERMODAL SYSTEMS, LLC, Greenville, OH (US)

( * ) Notice: Subject to any disclaimer, the term of this patent is extended or adjusted under 35 U.S.C. 154(b) by 416 days.

(21) Appl. No.: 14/962,136

(22) Filed: Dec. 8, 2015

(65) Prior Publication Data

US 2016/0107850 A1 Apr. 21, 2016

Related U.S. Application Data

(62) Division of application No. 13/152,536, filed on Jun. 3, 2011, now Pat. No. 9,238,470.
(Continued)

(51) Int. Cl.
*B65G 67/20* (2006.01)
*B65G 63/02* (2006.01)
(Continued)

(52) U.S. Cl.
CPC ............ *B65G 67/20* (2013.01); *B60J 7/1614* (2013.01); *B61D 3/00* (2013.01); *B61D 17/08* (2013.01);
(Continued)

(58) Field of Classification Search
CPC ...... B61D 3/005; B61D 17/046; B61D 17/06; B61D 17/08; B61D 17/10; B61D 39/006; B61D 47/00; B61D 47/005; B62D 33/0273; B62D 33/0207; B62D 33/0276; B62D 33/08; B60P 3/34; B60P 3/341; B61B 1/005; B65G 63/00; B65G 63/02; B65G 63/22; B65G 63/023; B65G 63/025;
(Continued)

(56) References Cited

U.S. PATENT DOCUMENTS 2,646,178 A 7/1953 Alvare
2,937,879 A 5/1960 Lion
(Continued)

FOREIGN PATENT DOCUMENTS

CH 680125 A5 * 6/1992 ........... B65G 63/022
DE 19608645 C1 * 1/1997 ........... B65D 88/126

*Primary Examiner* — Glenn F Myers
(74) *Attorney, Agent, or Firm* — AP Patents

(57) ABSTRACT

A vehicle includes a base, a pair of wheel sets mounted underneath the base in a spaced apart relationship to each other, at least one coupling members mounted on at least one end of the base along longitudinal axis of the vehicle, an enclosure upstanding on the base and having a pair of side wall structures, a pair of end wall members and a roof member joining upper edges of each of the pair of side wall members and the pair of end wall structures, the enclosure defining an interior compartment of the railway freight car and an apparatus configured to move the enclosure in a vertical direction relative to the base.

21 Claims, 14 Drawing Sheets

US 10,294,047 B2
Page 2

Related U.S. Application Data

(60) Provisional application No. 61/351,337, filed on Jun. 4, 2010.

(51) Int. Cl.
  *B60J 7/16* (2006.01)
  *B61D 3/00* (2006.01)
  *B61D 17/08* (2006.01)
  *B61D 39/00* (2006.01)
  *B65G 67/24* (2006.01)
  *B65D 88/58* (2006.01)

(52) U.S. Cl.
  CPC ........... *B61D 39/00* (2013.01); *B65G 63/022* (2013.01); *B65G 67/24* (2013.01); *B65D 88/58* (2013.01)

(58) Field of Classification Search
  CPC ........ B65G 67/20; B65G 67/24; B65G 67/04; B65D 88/122; B65D 88/123; B65D 88/126; B65D 88/127; B65D 88/129; B60J 7/1614
  See application file for complete search history.

(56) References Cited

U.S. PATENT DOCUMENTS

| | | | | |
|---|---|---|---|---|
| 2,977,900 | A | 4/1961 | Farrar | |
| 3,140,116 | A | 7/1964 | Speas | |
| 3,208,608 | A | 9/1965 | Tatlinger et al. | |
| 3,478,903 | A | 11/1969 | Tantlinger | |
| 3,591,033 | A | 7/1971 | Partridge | |
| 3,670,664 | A | 6/1972 | Thornton | |
| 3,674,305 | A * | 7/1972 | Steury | B60P 3/34 296/156 |
| 3,694,024 | A * | 9/1972 | Linville | B60J 7/042 296/26.05 |
| 3,801,177 | A * | 4/1974 | Fylling | B65D 88/12 206/335 |
| 3,994,240 | A * | 11/1976 | Berg | B61D 39/00 105/377.01 |
| 4,015,715 | A * | 4/1977 | Kelf | B65D 88/126 206/386 |
| 4,151,925 | A | 5/1979 | Glassmeyer | |
| 4,178,123 | A | 12/1979 | Loeffler | |
| 4,416,385 | A * | 11/1983 | Clare | B65D 88/129 108/55.1 |
| 4,543,027 | A * | 9/1985 | Jones | B65G 67/20 104/29 |
| 5,088,785 | A | 2/1992 | Lee | |
| 5,111,950 | A * | 5/1992 | Wylenzek | B65D 88/129 108/55.1 |
| 5,184,743 | A | 2/1993 | Suzuki et al. | |
| 5,488,911 | A * | 2/1996 | Riggin | B30B 9/3014 105/240 |
| 5,493,817 | A | 2/1996 | Speer | |
| 5,682,823 | A | 11/1997 | Tihansky et al. | |
| 6,112,929 | A | 9/2000 | Ota | |
| 6,183,176 | B1 * | 2/2001 | Weiner | B60P 1/00 105/375 |
| 6,227,397 | B1 | 5/2001 | Kim | |
| 6,260,907 | B1 | 7/2001 | Liu | |
| 6,447,038 | B1 | 9/2002 | Davis et al. | |
| 6,655,300 | B1 | 12/2003 | Clive-Smith et al. | |
| 6,655,726 | B2 | 12/2003 | Bergeron | |
| 7,014,238 | B2 | 3/2006 | Gonzalez | |
| 7,306,110 | B2 | 12/2007 | Petzitillo | |
| 7,704,032 | B2 | 4/2010 | Rash et al. | |
| 7,758,103 | B1 * | 7/2010 | Steury | B60P 3/34 296/156 |
| 8,585,347 | B2 * | 11/2013 | Lanigan, Sr. | B66C 19/007 414/342 |
| 2002/0021957 | A1 * | 2/2002 | Buoncuore | B61D 39/00 414/607 |
| 2005/0139141 | A1 | 6/2005 | Hey et al. | |
| 2005/0194807 | A1 * | 9/2005 | Gonzalez | A01M 31/025 296/26.05 |
| 2008/0277390 | A1 | 11/2008 | Nagura | |

\* cited by examiner

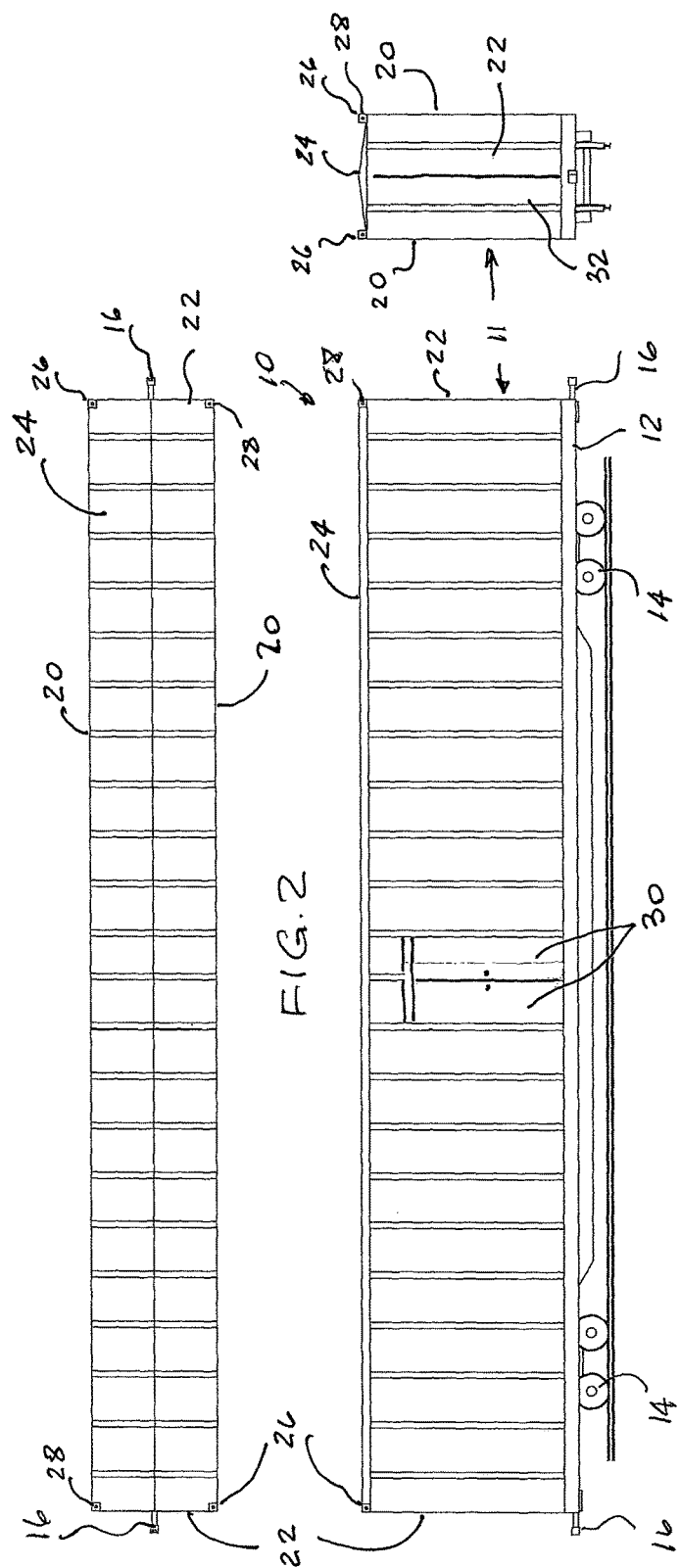

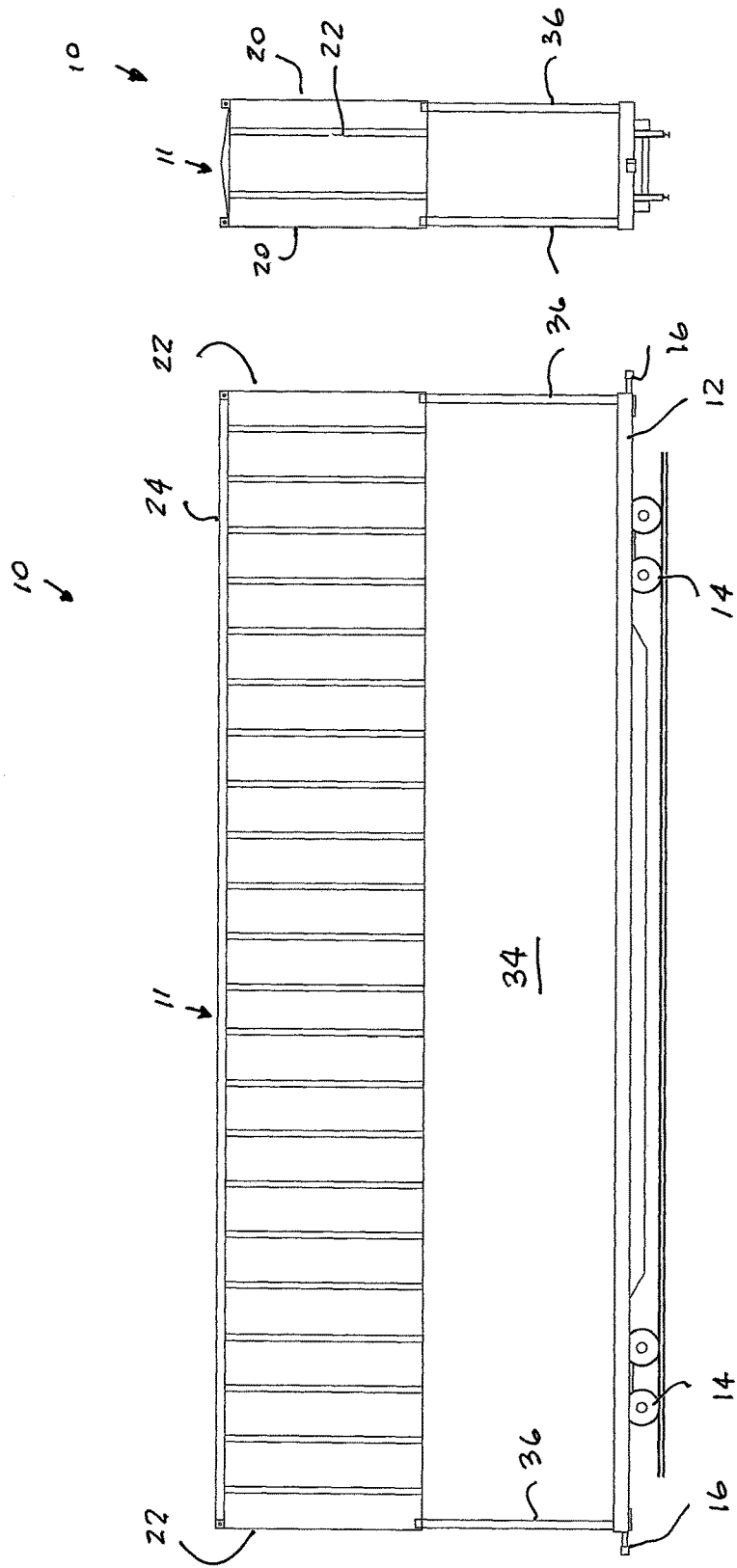

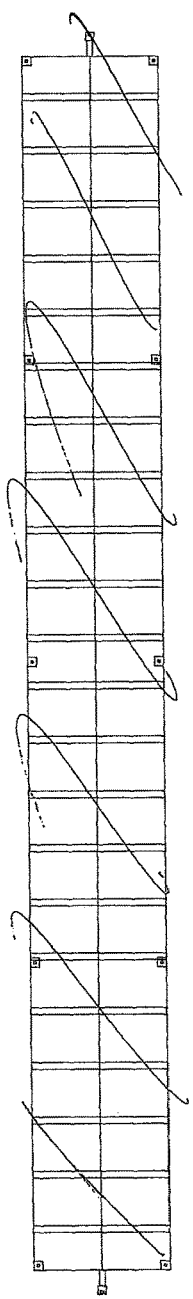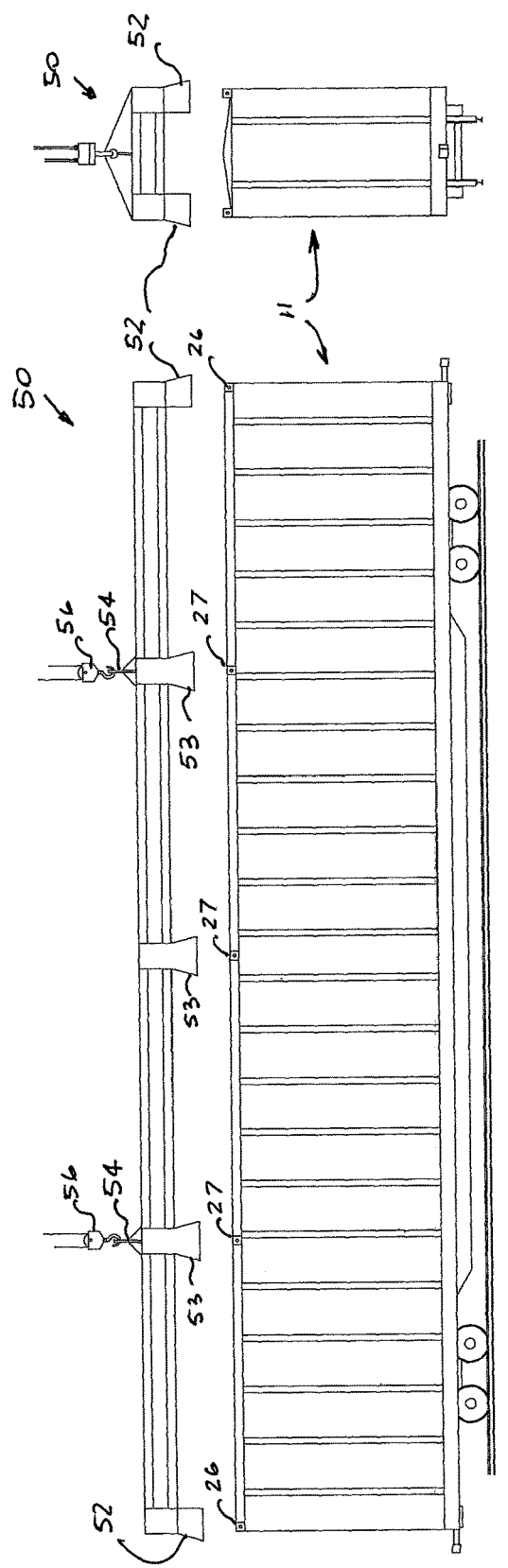

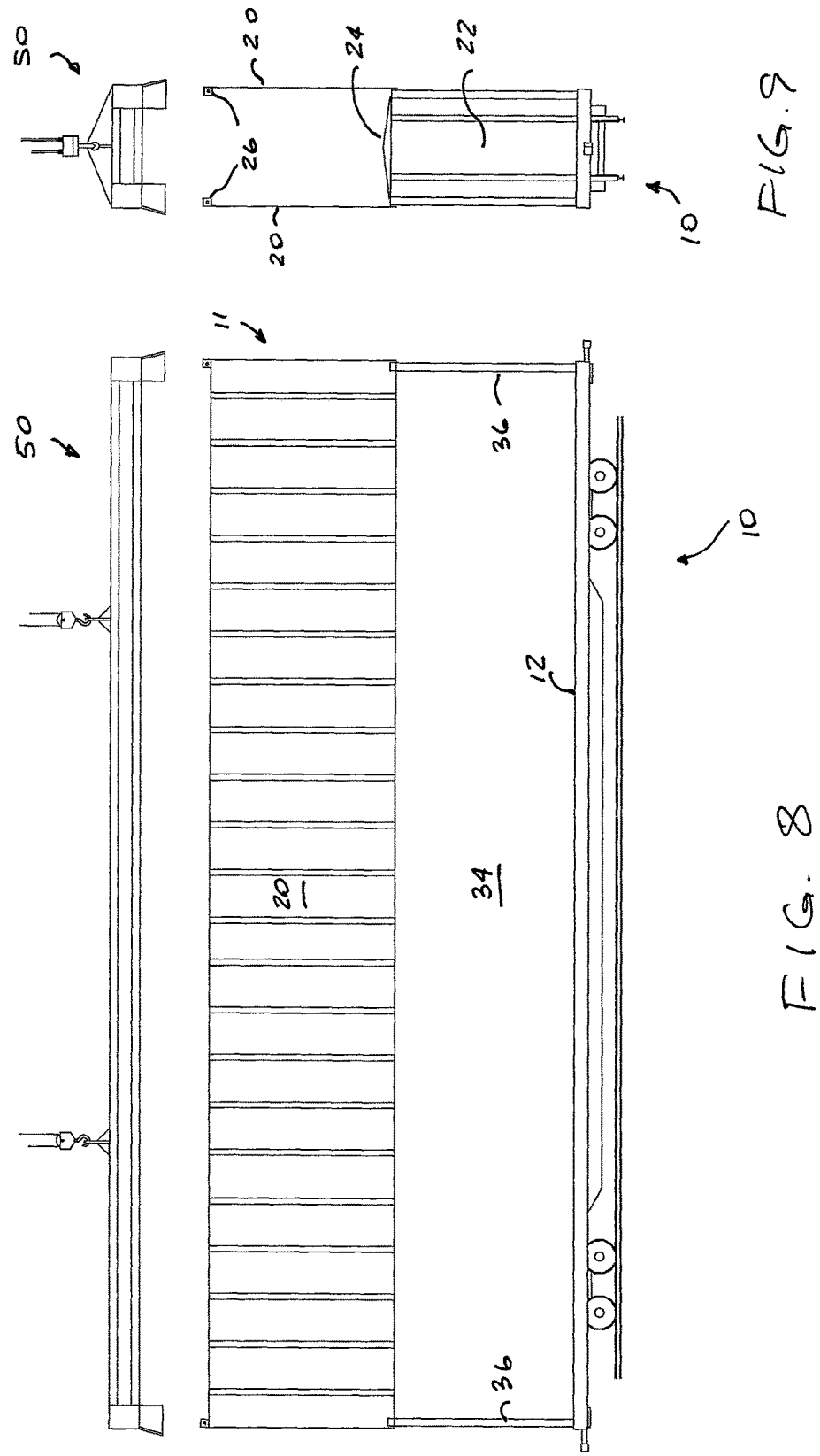

Raising Superstructure 11 to unlock

Locks 80 wedged into the wedges 76 at the top of the Corner Post 36

Superstructure 11 in raised position above wedges 76. Ready to lower onto the lock Superstructure 11 moving downwardly Above Reset Pins 74

Raising Superstructure 11 past the reset pins 74

Locks 80 lowering further past the Wedge Point 76

Locks 80 lowering past the Wedge Point 76

Reset Pins 74 turning Locks 80 over (both cannot be on the same plane)

Locks 80 reset, and can be lowered on down

Locks 80 almost past the Wedge Point 76

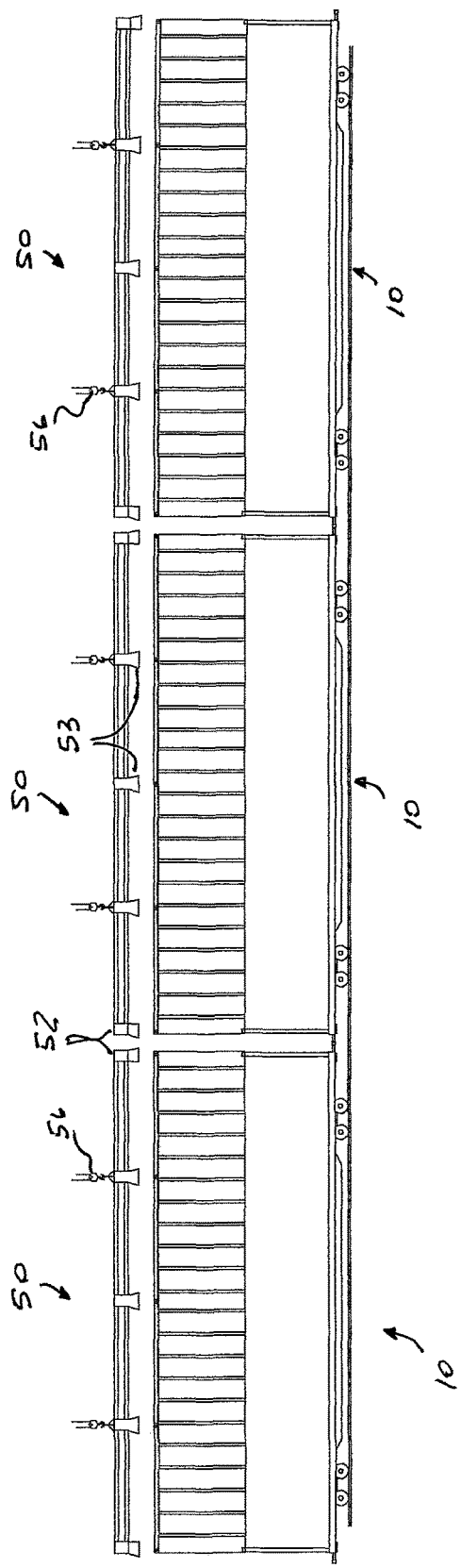

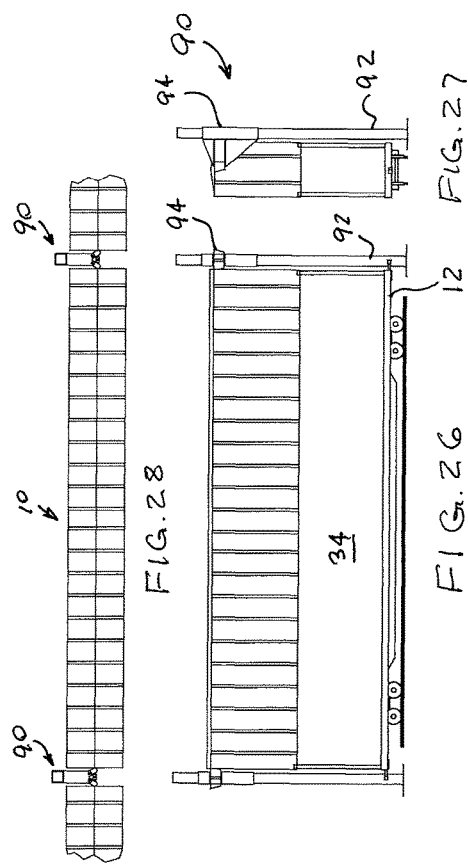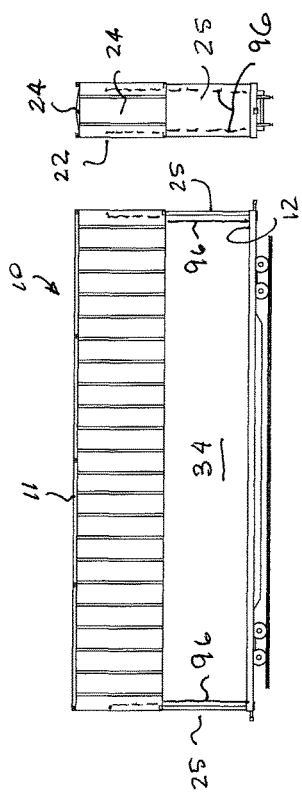

ENCLOSED RAILWAY FREIGHT CAR OR OVER-THE-ROAD TRAILER VAN HAVING WALLS AND ROOF MOVABLE IN A VERTICAL DIRECTION

CROSS-REFERENCE TO RELATED APPLICATIONS

This application is related to and claims priority from Provisional Patent Application Ser. No. 61/351,337 filed on Jun. 4, 2010. This application is a divisional of a prior non provisional application Ser. No. 13/152,536 filed Jun. 3, 2011, pending.

FIELD OF THE INVENTION

The present invention relates, in general, to cargo transport and, more particularly, this invention relates to an enclosed railway freight car or an over-the-road trailer van having walls and roof movable in a vertical direction for loading and unloading cargo.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND OF THE INVENTION

As is generally well known, covered railway freight cars, conventionally known as boxcars, are utilized extensively to transport cargo between cargo terminals. The cargo is generally loaded or unloaded through sliding doors disposed within the longitudinal side of the boxcar when the boxcar is parked parallel to the edge of the cargo terminal. Such loading/unloading process is characterized by higher than desirable efforts and costs, since the process is achieved by a material handling vehicle, such as a conventional fork lift truck, that can only access the cargo through these doors, necessitating frequent turns and longer travel distances. Although multiple fork lift trucks can be employed, only one such vehicle is able to enter and exit enclosed confines.

Similarly, the over-the-road trailer van is usually loaded or unloaded by a single material handling vehicle through the end doors also resulting in higher then desirable loading/unloading efforts and costs.

Therefore, there is a need for an improved enclosed railway freight car or an over-the-road trailer van that reduces loading/unloading efforts and costs.

SUMMARY OF THE INVENTION

In a first aspect, the invention provides a cargo carrying structure. The structure includes a base having a pair of generally planar surfaces spaced apart from each other to define thickness of the base, the base disposed generally horizontally during use of the vehicle. An enclosure upstands on the base and has a pair of side wall members, a pair of end wall member and a roof member joining upper edges of each of the pair of side wall members and the pair of end wall members, the enclosure defines an interior compartment of the cargo carrying structure. There is at least a pair of connectors, each of the at least pair of connectors mounted at each end of the enclosure adjacent the roof member thereof.

In a second aspect, the invention provides a railway freight car. The railway freight car includes a base having a pair of generally planar surfaces spaced apart from each other to define thickness of the base. There is a pair of wheel sets mounted underneath the base in a spaced apart relationship to each other. There is also a pair of coupling members, each of the pair of coupling members mounted at a respective end of the base along longitudinal axis of the railway freight car, the each of the pair of coupling members configured for attachment to an another coupling member of one of adjacent railway freight car and motive apparatus. An enclosure upstands on the base and has a pair of side wall members, a pair of end wall member and a roof member joining upper edges of each of the pair of side wall members and the pair of end wall members, the enclosure defines an interior compartment of the railway freight car. Also provided is means for moving the enclosure in a vertical direction relative to the base.

In a third aspect, the invention provides a method of loading or unloading at least one vehicle having an enclosure positioned on a generally horizontally disposed base and defining an interior compartment. The method includes the step of adapting the enclosure to move in a vertical direction relative to the base. Then, connecting the enclosure to at least one device configured to move the enclosure in the vertical direction. Next, moving, with the at least one device, the enclosure in the vertical direction. Substantially exposing the interior compartment. And finally, accessing the interior compartment with a material handling apparatus moving in a direction being generally perpendicular to a length of the at least one vehicle.

OBJECTS OF THE INVENTION

It is, therefore, one of the primary objects of the present invention to provide an enclosed railway freight car or an over-the-road trailer van having walls and roof movable in a vertical direction for loading and unloading cargo.

Another object of the present invention is to provide an enclosed railway freight car or an over-the-road trailer van having walls and roof movable in a vertical direction by means of a crane.

Yet another object of the present invention is to provide an enclosed railway freight car or an over-the-road trailer van having walls and roof movable in a vertical direction that reduces time end effort to load and unload cargo.

A further object of the present invention is to provide a method of loading and unloading cargo utilizing an afore-described enclosed railway freight car or an over-the-road trailer van having walls and roof movable in a vertical direction.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE DRAWINGS

FIG. 1 is a side elevation view of a railway freight car having walls and roof movable in a vertical direction;

FIG. 2 is a top planar view of the railcar of FIG. 1;

FIG. 3 is an end elevation view of the railcar of FIG. 1;

FIG. 4 is a side elevation view of the railcar of FIG. 1 with the side and roof being in raised position;

FIG. 5 is an end elevation view of the railcar of FIG. 4;

FIG. 6 is a side elevation view of the railcar of FIG. 1 with the side and roof being in lowered position and particularly illustrating a fixture for raising and lowering the sides and roof;

FIG. 7 is an end elevation view of the railcar of FIG. 6;

FIG. 8 is a side elevation view of the railcar of FIG. 1 particularly showing the sides being in raised position and roof being in a stationary positioned;

FIG. 9 is an end elevation view of the railcar of FIG. 8;

FIG. 25 is a side elevation view of the railcars of FIG. 1, particularly illustrating a plurality of devices for raising and lowering protective enclosure;

FIG. 26 is another side elevation view of the railcar, particularly illustrating devices for raising and lowering protective enclosure that are positioned at the end of the railcar;

FIG. 27 is an end elevation view of the railcar of FIG. 26;

FIG. 28 is a top planar view of the railcar of FIG. 26;

FIG. 29 is yet another side elevation view of the railcar, particularly illustrating a generally solid end bulkhead; and FIG. 30 is an end elevation view of the railcar of FIG. 29.

BRIEF DESCRIPTION OF THE VARIOUS EMBODIMENTS OF THE INVENTION

Figure 10:
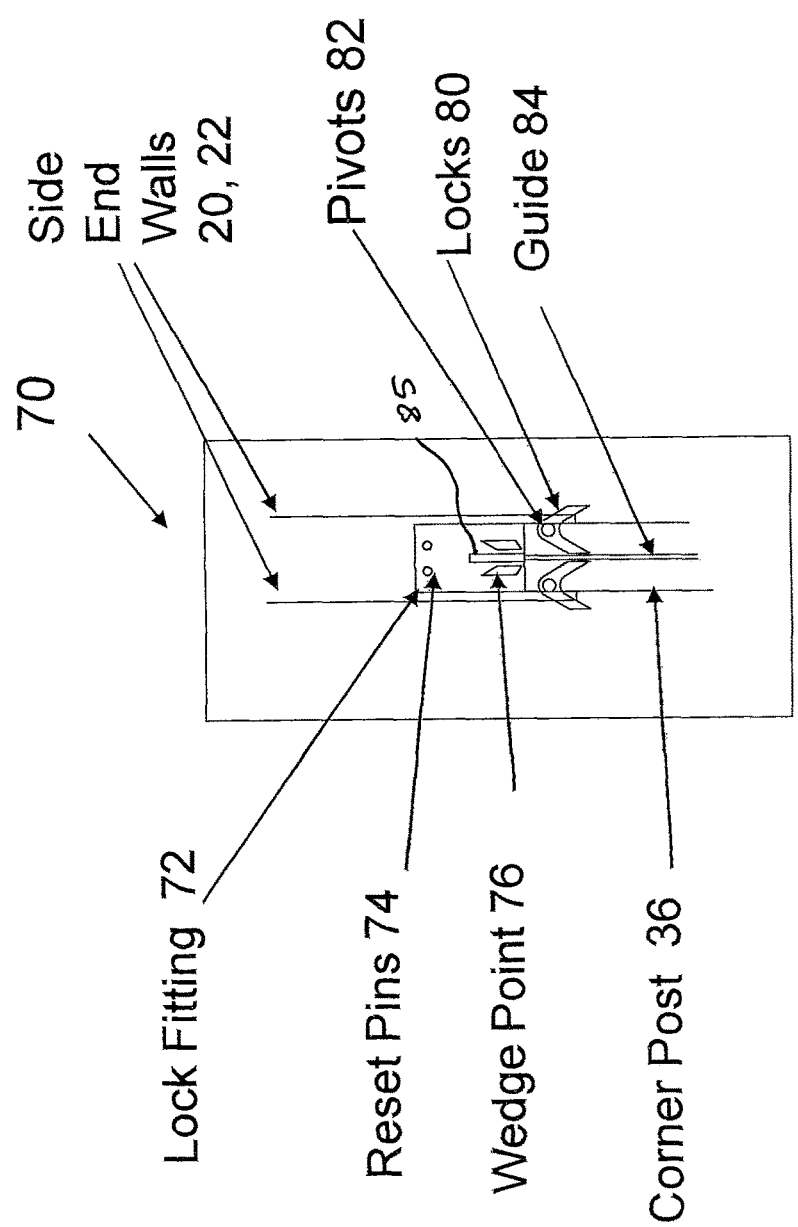
FIGS. 10-21 illustrate locking arrangement to support the walls in the raised position.
Figure 13:
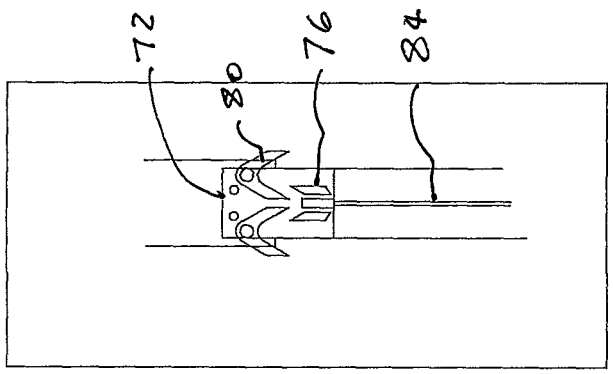

It is to be understood that the definition of a vehicle applies to a railway freight railcar or over the road trailer van having a base and an enclosure defining and protecting the interior compartment.

The instant invention is illustrated and described in combination with a railway freight car, although it will be apparent to those skilled in the relevant art that the instant invention may be applied to trailer vans and cargo containers and as such should not be interpreted as a limiting factor of the instant invention.

Now in a particular reference to FIGS. 1-3, therein is illustrated a railway freight or cargo car, hereafter referred to as "railcar", generally designated as 10. The railcar 10 has a base 12 with a top and bottom surfaces spaced apart from each other to define thickness of the base 12 and a pair of wheel sets 14 mounted below the bottom surface of the base 12 or underneath the base 12. A conventional coupler or coupling member 16 is centrally mounted at each end of the railcar 10 along longitudinal axis thereof. The remaining conventional components that are usually mounted underneath the base 12, such as brakes, impact force cushioning devices, brake pipe and the like, are omitted for the sake of brevity.

The railcar 10 also has protective enclosure 11 upstanding on the base 12 and defined by a pair of longitudinal (side) wall members 20 and a pair of transverse (end) wall members 22. Joining the upper edges of the wall members 20 and 22 is a roof member 24. The enclosure 11 defines the interior compartment 34 of the railcar 10. It is not necessary for the wall members 20 and 22 and a roof member 24 to be solid.

Also, as shown in FIGS. 1-3, the instant invention takes advantage of the inter box connectors (IBC) 26 that can be found on containers used to haul cargo in marine vessels. Each IBC 26 is mounted at each corner of the protective enclosure 11 and, more particularly, at the junction of the wall members 20, 22 with the roof member 24, and has a trio of apertures 28, each formed through one leg of the IBC 26 for receiving a locking pin therethrough.

Optional side door or doors 30 may be provided in one or both side wall members 20 and optional end doors 32 may be provided in one or both end wall members 22.

Now in reference to FIGS. 4-5, the side wall members 20 and the end wall members 22 in combination with the roof member 24 are shown in the raised position so as to allow a substantially unobstructed access to the hollow interior compartment 34 of the railcar 10. In order to raise the wall members 20, 22 and the roof member 24, the railcar 10 is equipped with a guide system or guiding means represented by corner posts 36 upstanding on the base 12 in operative alignment with the wall members 20, 22 and the roof member 24. The corner posts 36 are both provided for guiding and stabilizing the protective enclosure 11.

Furthermore, as best shown in FIGS. 6-7, there is provided a frame 50 that has at least a quartet of fittings 52 operatively interlocking with the IBCs 26 and at least a pair of brackets 54 that are adopted for engagement with hooks 56 of an overhead bridge gantry crane (not shown), so that the wall members 20, 22 and the roof member 24 can be selectively raised and lowered.

It is contemplated that additional fittings 27 having only a pair of apertures 28 can be provided and mounted along the upper longitudinal edges of the enclosure 11 of the railcar 10 and operatively mating with the fittings 53 of the frame 50. While only one frame 50 is illustrated in FIG. 6, the instant invention contemplates that a plurality of frames 50 may be used to expedite loading/unloading process, as best shown in FIG. 25.

It is further contemplated that access to the hollow interior 34 of the railcar 10 can be obtained by only raising the side wall members 20, and providing stationary end wall members 22 and roof member 24 as best shown in FIGS. 8-9. It is further contemplated, in reference to FIGS. 29 and 30, that the railcar 10 can be equipped with a pair of end bulk heads 25.

The protective enclosure 11 can be held in place by the overhead bridge gantry crane (not shown), however it is presently preferred to provide means, generally designated as 70, for locking such protective enclosure 11 in the raised position, wherein the bottom peripheral edge of the enclosure 11 is spaced a predetermined distance in a vertical direction from the upper surface of the base 12.

Now in reference to FIG. 10, the locking means 70 includes a fitting 72 that can be a plate secured to the corner post 36 adjacent to upper edge thereof. Mounted on the fitting 72 in a stationary position are a pair of reset pins 76 and a pair of wedges 76 for redundancy purposes with one reset pin 74 and a single wedge 76 are also being contemplated. An upper portion 85 of a guide 84 is also mounted on the fitting 72. Mounted to the interior surface of the enclosure 11 at the pivots 82 are the V-shaped locking members 80. The operation of the locking means 70 is shown in FIGS. 11-21. Essentially, the locking means 70 work on a mechanical principle of rotation of the locking members 80 that either engage wedges 76 or slide on the outer edges thereof based on the movement of the protective enclosure 11.

Figure 12:
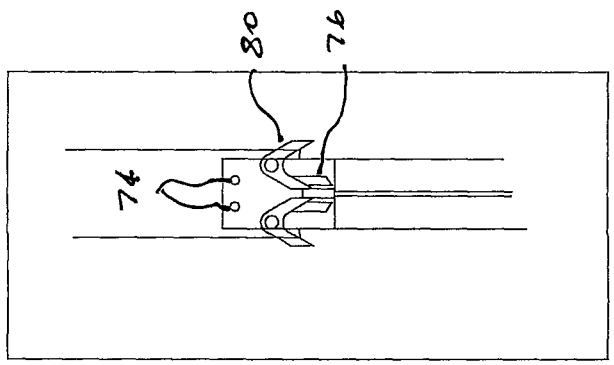
Figure 11:
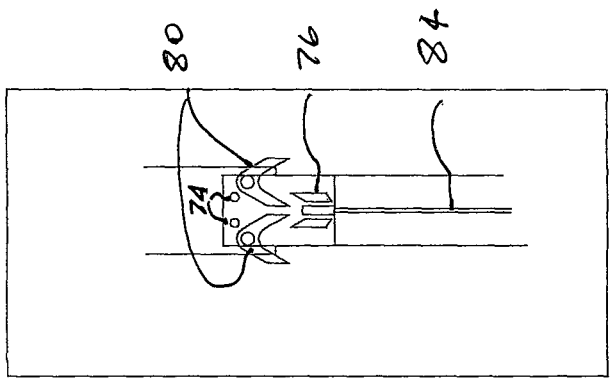
Figure 16:
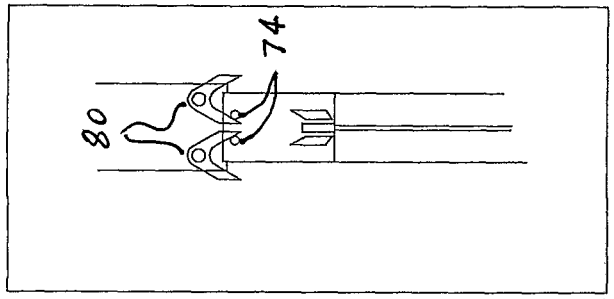
Figure 15:
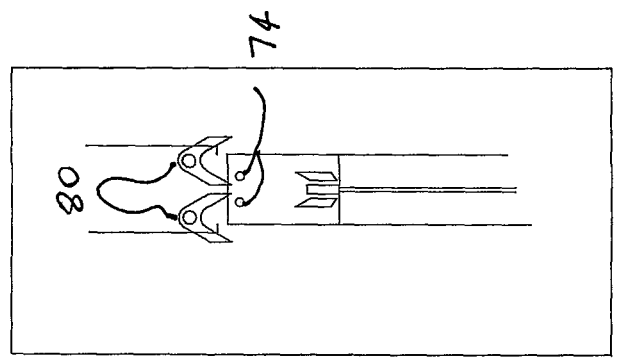
Figure 14:
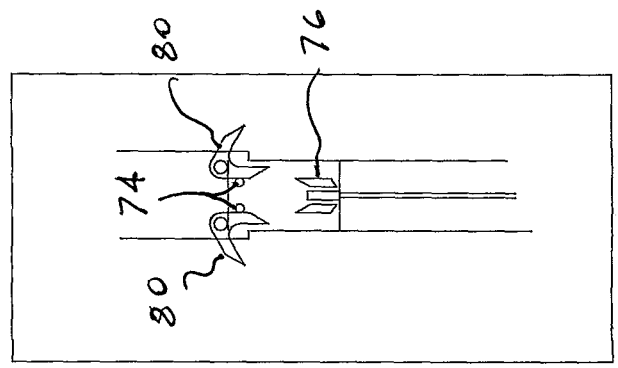
Figure 19:
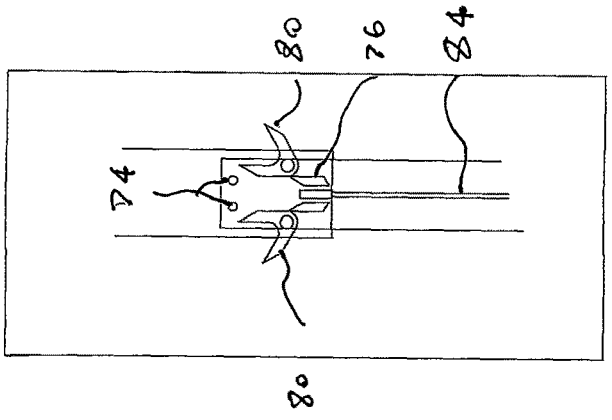
Figure 18:
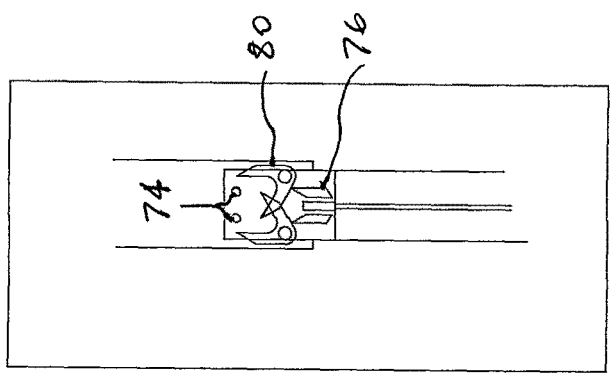
Figure 17:
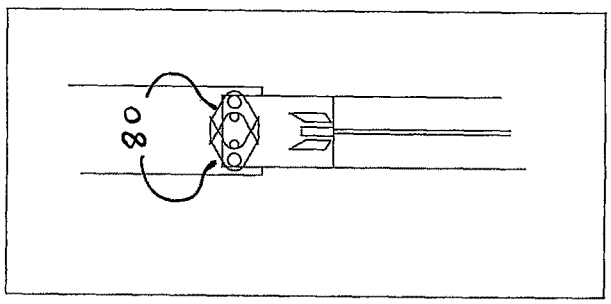
Figure 21:
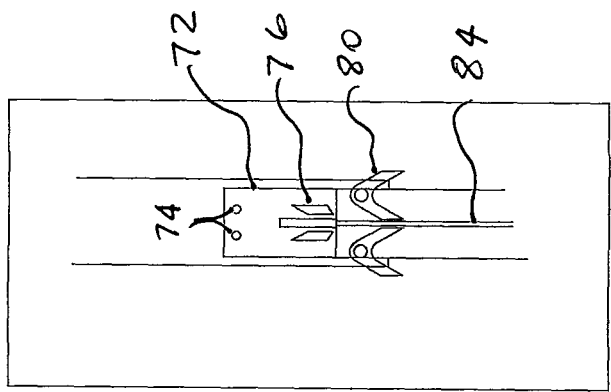
Figure 20:
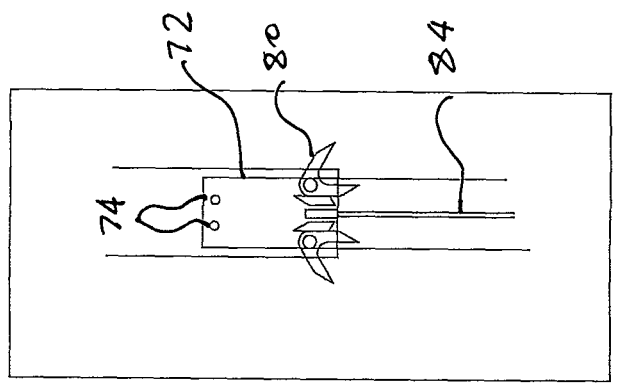

FIG. 11 shows the enclosure 11 being raised into a position wherein the locking members 80 are disposed above the wedges 76 but below the reset pins 74. FIG. 12 illustrates a condition wherein the enclosure 11 is lowered sufficiently so that the locking members 80 engage respective wedges 76 to lock the enclosure 11 in the raised position. The unlocking process starts with disclosure of FIG. 13, wherein the enclosure 11 is raised so that locking members 80 are again above the wedges 76 but below the reset pins 74. In FIG. 14, the enclosure 11 is raised further so that the locking members 80 engage the pins 74. In FIG. 15, the enclosure 11 is raised even further so that the locking members 80 are above the pins 74. FIG. 16 illustrates downward movement of the enclosure 11 so that the locking member 80 are about to reengage the pins 74. Further in FIG. 17, the pins 74 force the locking wedges 80 to rotate toward each other. In the present invention, the locking members 80 are disposed in different planes so that the ends one locking member 80 are disposed under the ends of another locking member 80. In FIG. 18, the locking members 80 continue to rotate and engage the upper ends of the wedges 76 and continue to rotate about such upper ends in FIG. 19. FIG. 20 illustrates a condition wherein the edge of each locking member 80 is moves in a substantially abutting engagement with the edge of the respective wedge 76. Finally, in FIG. 21, the locking members 80 pass the wedges 76 and are guided by the edges of the guide 84 so that the enclosure 11 can be lowered and rested on the base 12.

The use of such locking means 70 advantageously eliminates the need for power locks. Although such power locks are also contemplated.

FIGS. 26-28 illustrate another embodiment of the locking means, generally designated as 90, including a member having a stationary portion 92 thereof attached to a ground level adjacent to one end of the railcar 10 and further having a linearly movable portion 94 thereof configured to connect to the at least pair of connectors 27 mounted at each end of the railcar 10 adjacent roof member 24 thereof. Such means 90 may include a linear actuator operable by at least one of electrical, pneumatic and hydraulic power sources.

Furthermore, a stationary member of the linear actuator 96 may be mounted on at least one of the base 12, corner post 36 or bulk head 25 of the railcar 10, as best shown in FIGS. 29-30. For example, a linear actuator 96 may be of pneumatically operated type and having connection with a source of compressed air (not shown) that is mounted underneath the base 12 and is connected to a conventional brake pipe (not shown).

Figure 22:
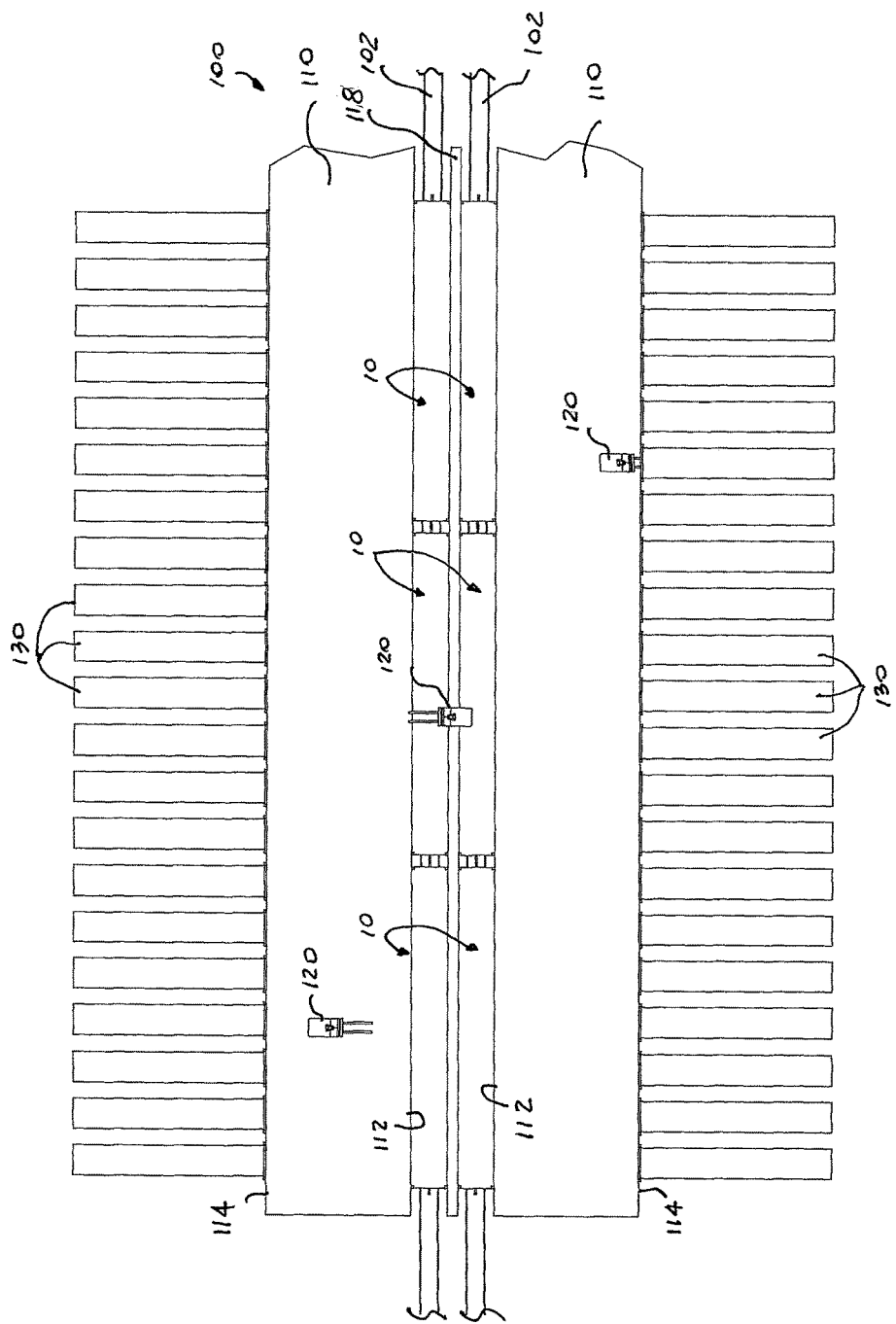
FIG. 22 is a top planar view of the railcars of FIG. 1 in combination with a loading/unloading cargo terminal.
Figure 23:
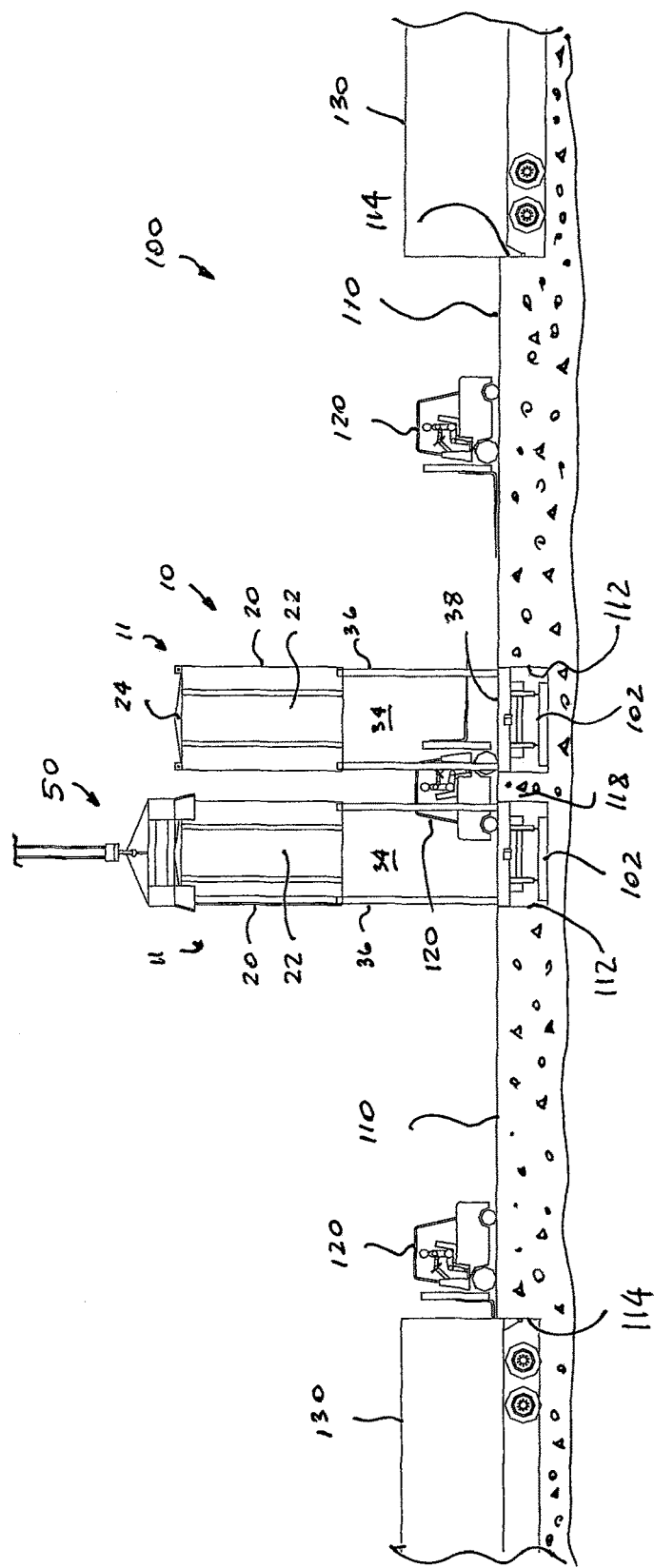
FIG. 23 is an end elevation view of the railcars and terminal of FIG. 10.

The system and method of using the railcar 10 is now described in combination with FIGS. 22-23. Illustrated therein is a freight/cargo transloading terminal, generally designated as 100. The terminal 100 is defined by at least a pair of parallel rail tracks 102, a pair of conventional elevated dock platforms 110 having surfaces disposed generally planar with the floor surfaces 38 of the railcar 10, each positioned external to one rail track 102 and a center narrow platform or walkway 118 positioned between the rail tracks 102.

To load or unload cargo, two consists of the railcars 10 are shown as being parked along inner edge 112 of a respective dock platform 110, the protective enclosure 11 is raised in order to allow the substantially unobstructed access to the hollow interior 34 which then can be accessed by the material handling vehicles, such as a conventional forklift 120, anywhere along the length of the railcar 10, with the forklift 120 moving in a direction generally perpendicular to a length of such railcar 10.

Further shown in FIGS. 22-23 are the trailer vans 130 that are parked at an opposed edge 114 of each platform 110 so as to receive the cargo unloaded from the railcars 10 and/or deliver the cargo to be loaded into the railcars 10.

In this arrangement, the cargo, preferably being palletized, can be loaded and unloaded in most rapid manner by multiple material handling vehicles 120 directly to and/or from the trailer vans 130 so as to eliminate the need for intermediate storage facilities and, more particularly, substantially reduce the time required to load and unload railcars 10 as compared with conventional rail cars only having the above described conventional side doors 30 or end door 32.

Figure 24:
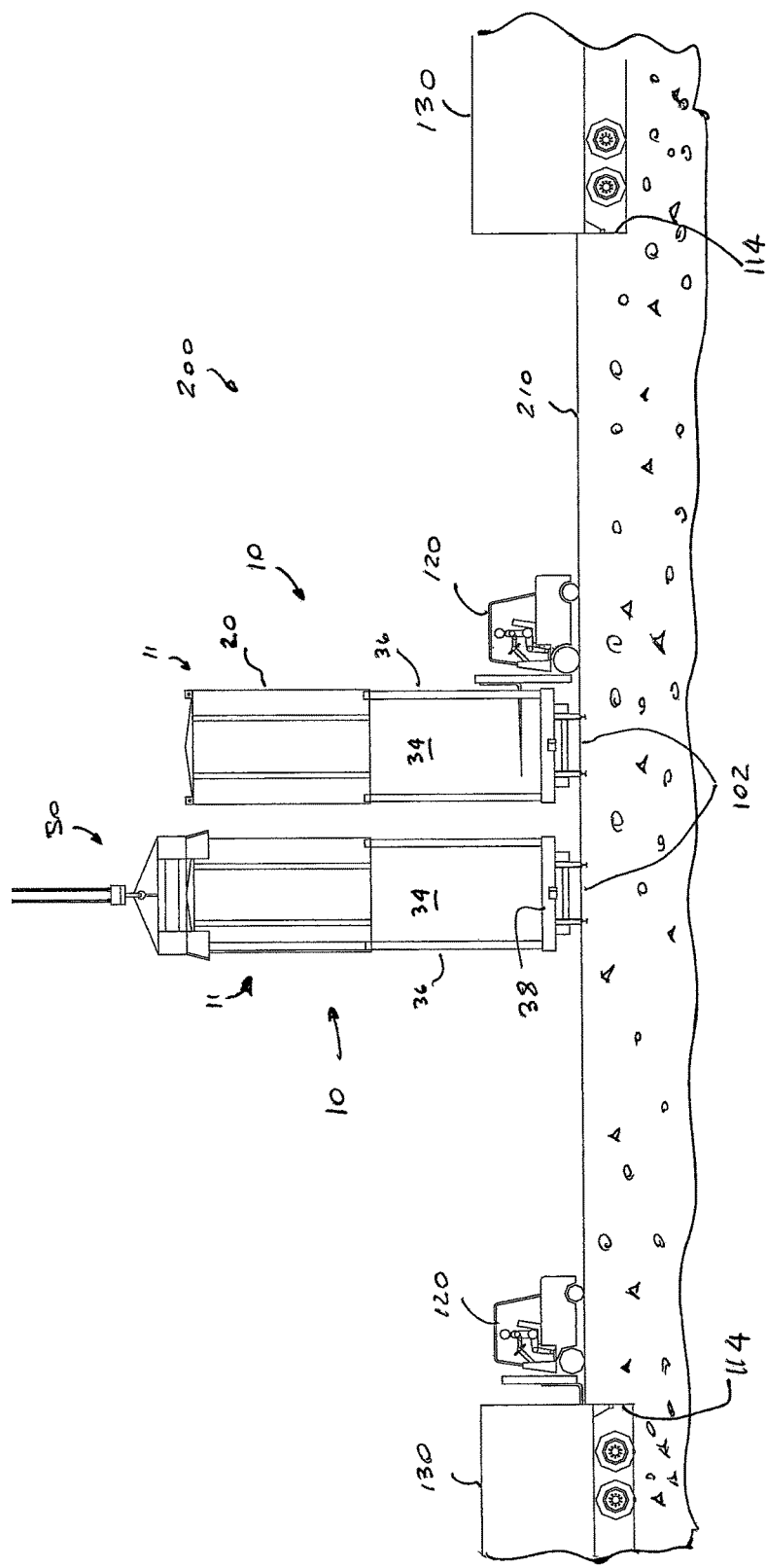
FIG. 24 is an end elevation view of the railcars loaded and unloaded at a ground level.

Another method of using the railcar 10 is now described in combination with FIG. 24. Illustrated therein is a freight/cargo transloading terminal, generally designated as 200. The terminal 200 is defined by at least a pair of parallel rail tracks 102 disposed at a ground (floor) level surface 210 wherein the floor surface 38 of the railcar 10 is elevated above the ground (floor) level surface 210.

To load or unload cargo, consists of the railcars 10 are parked at a preselected portion of the ground level surface 210, the protective enclosure 11 is raised in order to allow the substantially unobstructed access to the hollow interior 34 which then can be accessed by the material handling vehicles 120, anywhere along the length of the railcar 10.

As is in method of FIGS. 22-23, the trailer vans 130 are parked so as to receive the cargo unloaded from the railcars 10 and/or deliver the cargo to be loaded into the railcars 10. The method of FIG. 24 eliminates the need for conventional elevated dock platforms 110 allowing greater flexibility of loading/unloading the railcars 10. For example, the rail tracks 102 can be laid within the floor of a conventional warehouse structure, retail store or manufacturing facility with the railcars 10 loaded/unloaded in the environment protected from the weather elements. The trailer vans 130 may be also loaded/unloaded while being parked on such ground (floor) level surface 210. It would be understood by people of ordinary skill in the art that more than a pair of railcars 10 can be positioned in a side-by-side relationship for loading or unloading.

Either afore-described method advantageously creates a virtually seamless terminal floor expanse after positioning the railcars 10 to adjacent docks located along the side walls 20, thus forming a single contiguous surface comprised of railcar floors abutted to terminal dock floors. This opens the entire terminal surface for the unrestricted operation of forklifts 120. Multiple parallel tracks 102 where sections of railcars 10 can be spotted between three foot wide docks will allow a significant number of railcars 10 to process freight within a comparatively smaller space than existing transloading terminals. The current use of rail boards in transloading operations to bridge open space between a pair of adjacently disposed railcars 10 in place of walkways 118 allows a single forklift to move between multiple railcars 10 positioned side by side, thus reducing or substantially eliminating need for dock platforms.

Either afore-described method advantageously allows access to the entire freight in all of the railcars 10 simultaneously by elevating all of the enclosures 11. Existing transloading methods have severe forklift bottleneck restrictions at the boxcar side-doors; allowing only one forklift to handle freight within a boxcar at a time.

Either afore-described method advantageously creates an opportunity for utilizing more forklifts 120 per railcar 10 in transloading activity, which significantly increases the cross-dock throughput velocity of the freight.

Additional advantages of the afore-described systems and methods includes development of intermodal terminals by converting existing facilities and/or refitting facilities selected from hundreds of available structures that are conveniently located adjacent to railroads and highway ramps; substantially reducing the need in intermodal trucking operations for containers and chassis that require high costs for purchasing, complicated operational equipment tracking and poor maintenance controls when compared to conventional highway trailer vans; reduces modal transfer times and costs when compared to conventional double-stack terminal operations; ameliorates the problem of restricted highway weight compliances on truck activities to short distance pick-up and delivery (P&D) services only; transferring the long distance linehaul portion of the move to rail utilizing railcars 10 to avoid governmental weight compliance regulations that drastically restrict truck highway weight capacity; and substantially minimizes the need for maritime containers to be moved beyond the port or near-port terminals, thus reducing container demurrage charges and enhancing container inventory control for marine ship lines.

The above methods are also applicable with the use of other devices for raising and lowering the protective enclosure 11.

Although the present invention has been shown in terms of the railcar 10, it will be apparent to those skilled in the art, that the present invention may be applied to over-the-road trailer vans 130 as well as to railcars 10 having a soft protective structure, wherein the side portions are moveable in a longitudinal direction toward one or both end walls.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A method of loading or unloading railway freight cars each having an enclosure positioned on a generally horizontally disposed base and defining an interior compartment, said method comprising:
    providing at least a pair of parallel rail tracks between a pair of elevated dock platforms;
    positioning said railway freight cars on said at least pair of parallel rail tracks;
    positioning floor surfaces of said railway freight cars planar with surfaces of said pair of elevated dock platforms;
    adapting each enclosure or a portion thereof to move in a vertical direction relative to said base;
    providing a plurality of devices, with each device from said plurality of devices being positioned, during use, external to one end of said each railway freight car, so that a pair of devices from said plurality of devices being configured to move said each enclosure or said portion thereof in said vertical direction;
    connecting said each enclosure or said portion thereof to said pair of devices;
    moving, with said pair of devices, said each enclosure or said portion thereof in said vertical direction; and
    accessing said interior compartment of said each railway freight car with a material handling apparatus moving in a direction being generally perpendicular to a length of said each railway freight car.

2. The method of claim 1, wherein adapting said each enclosure to move in said vertical direction comprises providing a quartet of corner posts.

3. The method of claim 1, wherein adapting said each enclosure to move in said vertical direction comprises providing a pair of end bulk heads, each of said pair of bulkheads upstanding on an upper surface of said base at one end thereof.

4. The method of claim 1, wherein said each device comprises:
    a pair of connectors, each mounted at one end of said enclosure adjacent a roof member thereof; and
    a stationary portion of said each device attached to a ground level; and
    a linearly movable portion of said each device configured to connect to one of said pair of connectors.

5. The method of claim 1, further comprising locking said each enclosure at least in a position wherein a bottom edge of said enclosure is spaced vertically at a distance from a top surface of said base.

6. The method of claim 5, wherein locking said each enclosure comprises providing a plurality of stationary locking fittings, each comprising an elongated guide member, a pair of wedges mounted along edges of said elongated guide member in close proximity to a top end thereof, a pair of pins mounted above said pair of wedges, each of said elongated guide member, said pair of wedges and said pair of pins mounted stationary to a stationary portion of said each railway freight car and plurality of locking members so that a pair of locking members are positioned in operative alignment with said each locking fitting and mounted for pivotal movement on a portion of said enclosure, each of said pair of locking members operatively engaging a respective pin of said pair of pins, wedge of said pair of wedges and edge of said elongated guide member.

7. The method of claim 5, wherein locking each enclosure comprises providing a pair of connectors, each mounted at one end of said enclosure adjacent a roof member thereof; positioning a device external to one end of said each freight railway car, said device comprising a stationary portion thereof attached to a ground level adjacent to said one end of said each freight rail vehicle and further comprising a linearly movable portion thereof configured to connect to one of said pair of connectors; and connecting said linearly movable portion to a respective connector.

8. The method of claim 1, further comprising providing said at least pair of parallel rail tracks at a ground level surface.

9. The method of claim 1, wherein adapting said each enclosure to move in said vertical direction comprises providing stationary end wall members and a roof member and only raising side wall members.

10. A method of loading or unloading railway freight cars each having an enclosure positioned on a generally horizontally disposed base and defining an interior compartment, said method comprising:
    providing at least a pair of parallel rail tracks between a pair of elevated dock platforms;
    positioning at least two consists of said railway freight cars in a parallel alignment with each other on said at least pair of rail tracks, each of said at least two consists comprising a plurality of said railway freight cars disposed in a series with each other along a length of each consist, where floor surfaces of said railway freight cars being positioned planar with surfaces of said at least pair of elevated dock platforms;

raising each enclosure or a portion thereof in a vertical direction away from said base;

accessing each interior compartment with one or more material handling apparatuses moving in a direction being generally perpendicular to a length of said each railway freight car and anywhere along said length.

11. The method of claim 10, wherein raising said each enclosure or said portion thereof comprises providing a quartet of linear actuators and coupling said quartet of linear actuators to one of hydraulic, pneumatic and hydraulic power sources, each of said quartet of linear actuators having a member attached to one of said enclosure and said base, said member linearly movable in said vertical direction.

12. The method of claim 10, wherein raising said each enclosure or said portion thereof comprises:

providing a quartet of connectors, each of said quartet of connectors mounted at each corner of said enclosure adjacent a roof member thereof and having a trio of apertures, each of said trio of apertures formed through one leg of said each of said quartet of connectors;

providing a generally rectangular frame member having a quartet of fittings disposed at each corner thereof, each of said quartet of fitting sized and shaped so as to mate with a respective connector; and mating said each of said quartet of fitting to said respective connector.

13. The method of claim 12, further comprising attaching said frame member to an apparatus capable of moving said frame member in said vertical direction and moving, with said apparatus, said frame and said enclosure or said portion thereof.

14. The method of claim 12, further comprising:

mounting additional fittings along upper longitudinal edges of said each enclosure;

Mounting additional fittings on said frame member; and operatively mating said additional fitting on said frame with said additional fittings on said each enclosure.

15. The method of claim 1, further comprising providing at least a pair of parallel rail tracks between a pair of elevated dock platforms, positioning said railway freight cars on said at least pair of parallel rail tracks, and positioning floor surfaces of said railway freight cars planar with surfaces of said pair of elevated dock platforms.

16. The method of claim 10, further comprising bridging a distance between parallel disposed railway freight cars and moving said one or more material handling apparatuses in said direction between said two consists of said railway freight cars and through said each interior compartment.

17. The method of claim 10, further comprising positioning trailer vans in an alignment with said direction and moving said one or more material handling apparatuses in said direction between said freight railway cars and said trailer vans.

18. The method of claim 10, wherein providing said at least pair of parallel rail tracks comprises positioning said at least pair of parallel rail tracks below a ground level having said one or more material handling apparatuses moving on.

19. The method of claim 10, wherein positioning said at least two consists comprises providing said at least pair of parallel rail tracks at a ground level and elevating floor surfaces of said railway freight cars above said ground level.

20. A method of loading or unloading railway freight cars each having an enclosure positioned on a generally horizontally disposed base and defining an interior compartment, said method comprising:

providing a pair of dock platforms, each with a surface elevated above a ground level;

providing two parallel rail tracks below surfaces of said dock platforms and between said pair of elevated dock platforms;

positioning two consists of said railway freight cars in a parallel alignment with each other on said two parallel rail tracks with floor surfaces of said railway freight cars being planar with said surfaces of said elevated dock platforms, each of said two consists comprising a plurality of said railway freight cars disposed in a series with each other along a length of said consist;

positioning trailer vans adjacent an edge of each elevated dock platform and in a direction being generally perpendicular to a length of said railway freight cars;

raising each enclosure or a portion thereof in a vertical direction away from said base;

bridging a distance between parallel disposed railway freight cars and moving said one or more material handling apparatuses through said interior compartment;

accessing each interior compartment with one or more material handling apparatuses moving in said direction and anywhere along said length; and moving said one or more material handling apparatuses in said direction between said freight railway cars and said trailer vans.

21. The method of claim 20, further comprising bridging a distance between parallel disposed railway freight cars and moving said one or more material handling apparatuses through said interior compartment.

* * * * *